(12) United States Patent
Briliauskas et al.

(10) Patent No.: US 11,663,334 B1
(45) Date of Patent: May 30, 2023

(54) SYSTEM AND METHOD FOR COMPUTER SECURITY AUGMENTED DATA SET ALGORITHM TRAINING

(71) Applicant: UAB 360 IT, Vilnius (LT)

(72) Inventors: Mantas Briliauskas, Vilnius (LT); Aleksandr Ševčenko, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/728,518

(22) Filed: Apr. 25, 2022

(51) Int. Cl.
*G06F 21/56* (2013.01)
*G06F 8/41* (2018.01)
*G06F 8/52* (2018.01)
*G06N 20/00* (2019.01)

(52) U.S. Cl.
CPC ............ *G06F 21/566* (2013.01); *G06F 8/433* (2013.01); *G06F 8/52* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2016/0048683 A1* | 2/2016 | Sanders | H04L 63/145 726/23 |
| 2018/0018459 A1* | 1/2018 | Zhang | G06F 21/566 |
| 2018/0183815 A1* | 6/2018 | Enfinger | H04L 63/145 |
| 2018/0203998 A1* | 7/2018 | Maisel | G06F 21/56 |
| 2018/0211140 A1* | 7/2018 | Davis | G06F 21/561 |
| 2019/0108338 A1* | 4/2019 | Saxe | G06F 21/562 |
| 2020/0092306 A1* | 3/2020 | Jusko | G06F 16/285 |
| 2021/0048993 A1* | 2/2021 | Burke | G06F 8/53 |
| 2022/0083659 A1* | 3/2022 | Ma | G06N 20/20 |
| 2022/0147815 A1* | 5/2022 | Conwell | G06N 3/0454 |

OTHER PUBLICATIONS

Botacin et al., "RevEngE is a dish served cold: Debug-Oriented Malware Decompilation and Reassembly," 2019, ACM, 12pg. (Year: 2019).*

* cited by examiner

*Primary Examiner* — Ryan D. Coyer
(74) *Attorney, Agent, or Firm* — Moser Taboada

(57) ABSTRACT

Systems and methods for data augmentation used in training an anti-malware (AM) machine learning model are provided herein. In some embodiments, a method for data augmentation may include receiving a first plurality of binary files each having a first binary structure, wherein the first plurality of binary files include one or more known malicious and benign files; modifying the binary structure of each of the first plurality of binary files to produce a second plurality of binary files each having a second binary structure that is different from the first binary structure; using the first and second plurality of binary files to train an AM machine learning model as to which files are malicious and which files are benign; and using the trained AM machine learning model to identify new malicious files.

20 Claims, 3 Drawing Sheets

SYSTEM AND METHOD FOR COMPUTER SECURITY AUGMENTED DATA SET ALGORITHM TRAINING

FIELD

The invention relates generally to computer security and antimalware solutions, and more particularly to data augmentation used in training an anti-malware (AM) machine learning model.

BACKGROUND

Data augmentation is a strategy that enables practitioners to significantly increase the diversity of data available for training models, without actually collecting new data. Data augmentation techniques such as cropping, padding, and horizontal flipping are used to train large neural networks. However, data augmentation is difficult in Antimalware (AM) solutions since the base material is typically binary code and it does not yield to simple manipulation to expand the training data set.

Thus, there is a need for improved data augmentation systems and methods for use in training AM machine learning models/algorithms.

SUMMARY

Systems and methods for data augmentation used in training an anti-malware (AM) machine learning model are provided herein. In some embodiments, a method for data augmentation may include receiving a first plurality of binary files each having a first binary structure, wherein the first plurality of binary files include one or more known malicious files and one or more known benign files; modifying the binary structure of each of the first plurality of binary files to produce a second plurality of binary files each having a second binary structure that is different from the first binary structure, and wherein each modified binary file is functionality similar to the corresponding file in the first plurality of binary files from which it was created; using the first and second plurality of binary files to train an AM machine learning model as to which files are malicious and which files are benign; and using the trained AM machine learning model to identify new malicious files.

In other method embodiments, the method includes receiving files that are known to be both malicious and benign from at least one of external sources and internal sources; altering each file's binary structure, wherein altering the a file's binary structure may include decompiling or reverse engineering the binary to reproduce the source code, or obtaining the source by some other means, and recompiling using different compiler options or different compilers, and whereas each altered file binary structure creates a larger data set than that of the files as originally received and each altered file is functionality similar to the received file and each altered file's status as malicious or benign matches each respective received file's status as malicious or benign; using the larger data set to train a machine learning algorithm what files are malicious and what files are benign as the larger data set improves the accuracy of the machine learning algorithm compared to training the machine learning algorithm using just the files as originally received; and providing a report via the input/output device based upon the machine learning algorithm's determination.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
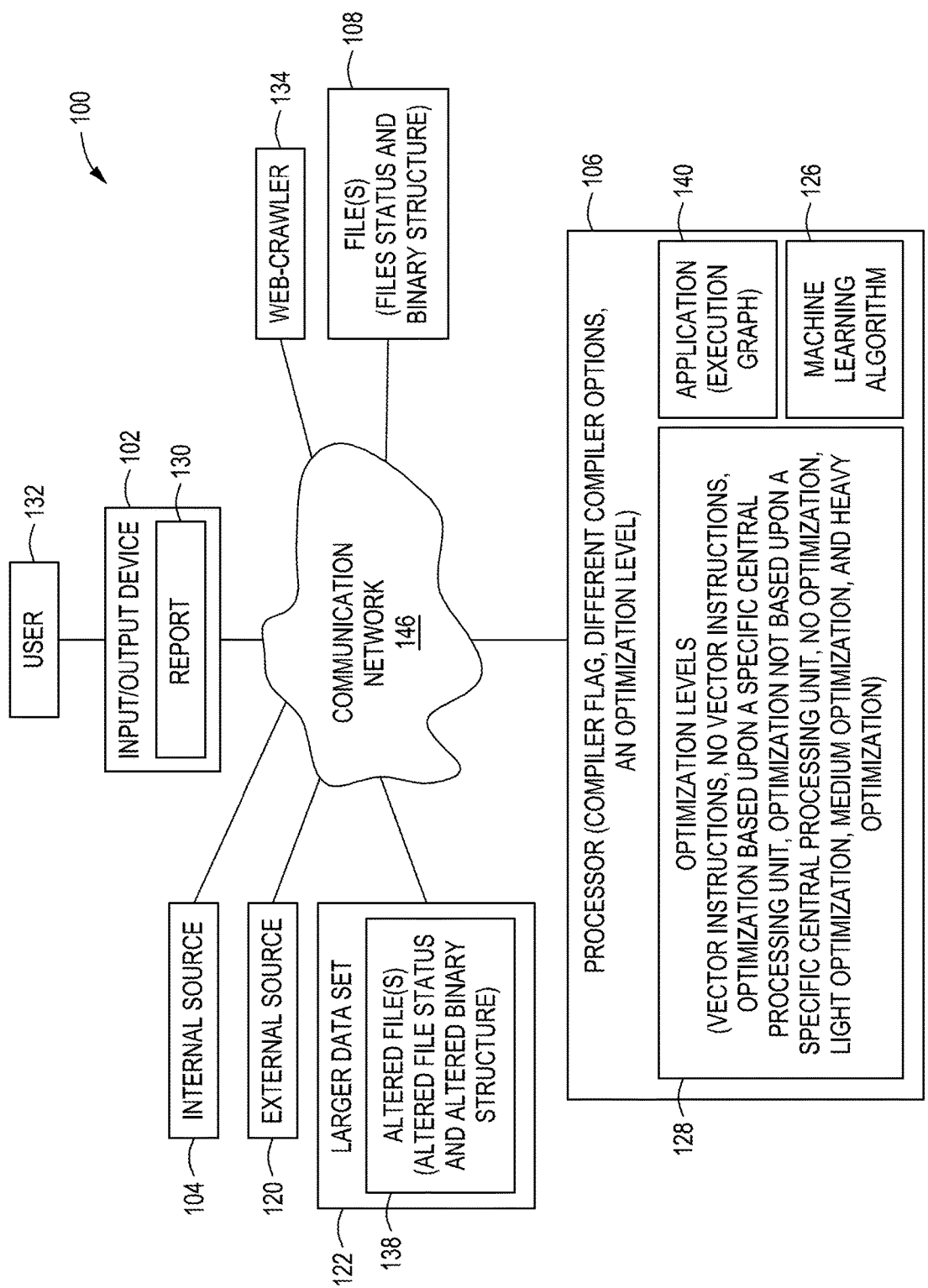
FIG. 1 depicts a high-level block diagram of a network architecture of a system for data augmentation used in training an anti-malware (AM) machine learning model in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, and systems) for data augmentation used in training an anti-malware (AM) machine learning model. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Data augmentation is a strategy that enables practitioners to significantly increase the diversity of data available for training models, without actually collecting new data. Methods and systems are described herein to achieve data augmentation in AM solutions by, for example in some embodiments, decompiling and recompiling binary code with different flags thus producing a different structure. In other embodiments, data augmentation may be achieved by performing a binary code analysis that extracts compilation instructions, modifies the instructions, and recompiles the files. Still other embodiments described herein may use execution graphs and/or machine learning based code trees to produce additional binary files for data augmentation used in training an anti-malware (AM) machine learning model.

In some embodiments, the system 100 includes an input/output device 102, and a processor 106 programmed to receive files 108 that are known to be both malicious and benign from at least one of external sources 120, e.g. files on the Internet, and internal sources 104, e.g. files from a user's 132 database running system 100. The processor 106 also alters each file's 108 binary structure, wherein altering the file's binary structure may include decompiling or reverse engineering the binary to reproduce the source code, or obtaining the source code by some other means, and recompiling using different compiler options or different compilers. In some embodiments, the different compiler options are different optimization levels 128 that may include at least one of vector instructions, no vector instructions, optimization based upon a specific central processing unit, optimization not based upon a specific central processing unit, no optimization, light optimization, medium optimization, and heavy optimization, which results in additional altered files 138. By doing this, each altered file 138 binary structure creates a larger data set 122 than that of the files 108 as originally received and each altered file is functionality similar to the received file and each altered file's status as malicious or benign matches each respective received file's status as malicious or benign. The processor 106 additionally uses the larger data set 122 to train a machine learning algorithm 126 what files 108 and 138 are malicious and what files are benign as the larger data set improves the accuracy of the machine learning algorithm compared to training the machine learning algorithm using just the files 108 as originally received. In other words, the larger data set 122 is advantageous because the machine learning algorithm 126 has more examples to work with and that helps to improve the accuracy of the machine learning algorithm 126. The processor 106 also provides a report 130 via the input/output device 102 based upon the machine learning algorithm's 126 determination.

For example, the alteration of a benign file 108 to become an altered file 138 may be flagged by some computer security systems as malware because it has a different form even though it is functionally equivalent to the original benign file 108. Consequently, machine learning algorithm 126 should be exposed to as many structural variations of the original benign file 108 as is reasonable so that it can make a more trusted determination when faced with files 108 of varying format. By doing this, the system 100 can advantageously protect and train against malware that evades detection by inserting garbage or benign code into itself to fool machine learning models. The system 100 can advantageously account and train for this by altering the benign file 108 being analyzed in much the same way, before training.

In some embodiments, each altered file 138 has at least one of different data inside, different byte size, different hash codes, and different instructions, than the corresponding binary file from the first plurality of binary files from which it was created, but functionally, each altered file is the equivalent of the original file 108. In other words, altered files 138 are structurally different from a respective file 108, but are functionally equivalent to the respective file 108.

In some embodiments, the binary analysis alters the compiled binary assembly code of a received file 108 to produce a different binary that is equivalent in performance, in terms of functionality and/or in terms of speed of execution, as the original compiled binary assembly code. In other embodiments, the received file 108 is altered by at least one of extracting an execution graph based upon the code instructions and modifying the execution graph, and/or modifying the binary assembly code to change the branching. In some embodiments, once the execution graph is modified, the assembly from the execution graph is rebuilt.

In some embodiments, the received file's 108 decompiled code is directed to the machine learning algorithm 126 and the machine learning algorithm alters the received file's decompiled code, which is then rebuilt by one or more compilers. In other embodiments, the execution graph can be generated by an application that tracks the received file's processes (e.g. application 140) thus enabling the received file's binary structure to be altered by adjusting the assembly code.

In some embodiments, the file 108 is selected by at least one of a user 132 and a web-crawler 134. For example, the web-crawler 134 is pulling down files 108 from external sources continuously to generate the largest data set of files it can for system 100. In some embodiments, the web-crawler 134 may obtain opensource code as a source of benign application code that can later be modified in various ways as described above.

In one embodiment, the system 100 communicates over a communications network 146, which enables a signal to travel anywhere within the system and/or to any other component/system connected to the system. The communications network 146 is wired and/or wireless, for example. The communications network 146 is local and/or global with respect to system 100, for instance.

In some embodiments, system 100 uses a method to achieve data augmentation in anti-malware by decompiling and recompiling binary code with different flags thus producing a different structure. In some embodiments, decompiling binary code is done automatically without human intervention. In other embodiments, the binary code may be decompiled by a user. In other embodiments, system 100 can use a binary code analysis that extracts compilation instructions, then modifies the instructions and recompiles the files. Additionally, system 100 uses a method where machine learning models based on code trees are used for the same purpose.

In some embodiments, the system 100 enables self-supervised learning of a machine learning algorithm 126 by using data augmentation in malware detection. For example, the system 100 decompiles a file 108 and then recompiles the file with different flags so that the file has a different structure thereby enlarging the data set available to train the machine learning algorithm. That is, in some embodiments, altering a file's binary structure may include decompiling or reverse engineering the binary to reproduce the source code, or obtaining the source by some other means, and recompiling the source code using different compiler options or different compilers. In other embodiments, the system 100 performs binary code analysis, instruction extraction, modification of the extracted instructions, and the recompiling to enlarge the data set available to train the machine learning algorithm 126.

In other embodiments, the system 100 performs binary code analysis, instruction extraction, modification of the extracted instructions, and the recompiling to enlarge the data set 122 available to train the machine learning algorithm 126.

Figure 2:
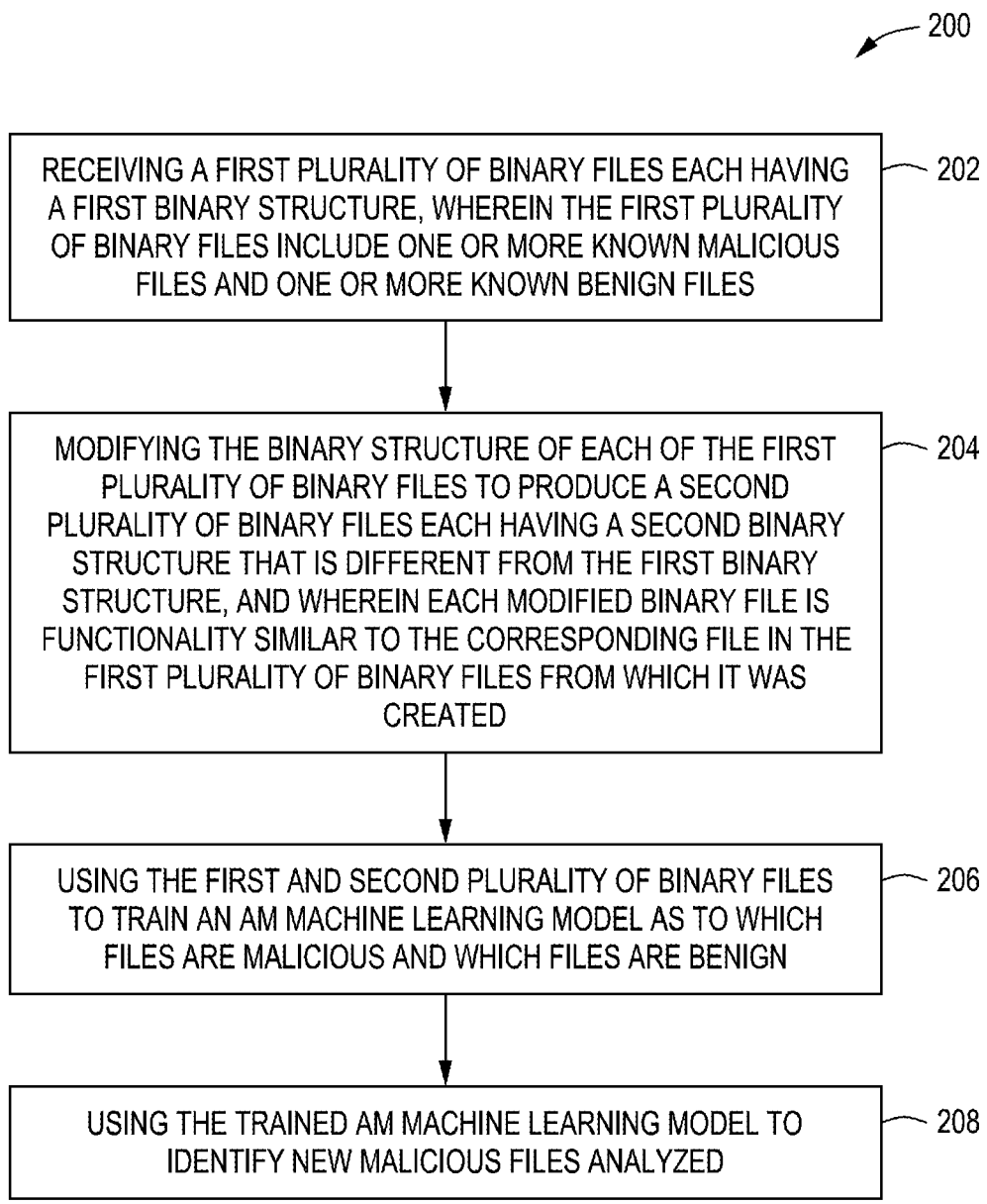
FIG. 2 depicts a flow diagram of a method for data augmentation used in training an anti-malware (AM) machine learning model, in accordance with an embodiment of the present principles.

FIG. 2 is an example process flow diagram of a method 200 for data augmentation used in training an anti-malware (AM) machine learning model, in accordance with an embodiment of the present principles. Such a method 200 may begin at 202 by receiving a first plurality of binary files each having a first binary structure, wherein the first plurality of binary files include one or more known malicious files and one or more known benign files.

At 204, the binary structure of each of the first plurality of binary files is modified to produce a second plurality of binary files each having a second binary structure that is different from the first binary structure. Each modified binary file is functionality similar to the corresponding file in the first plurality of binary files from which it was created. In some embodiments, modifying the binary structure of each of the first plurality of binary files to produce the second plurality of binary files at 204 may include decompiling each of the first plurality of binary files, and recompiling each of the first plurality of binary files to produce the second plurality of binary files each having the second binary structure that is different from the first binary structure. In some embodiments, the recompiling is performed using at least one of different compiler flags, different compiler options, a different compiler, or a different optimization level, than was used in producing the first plurality of binary files. The different optimization level may include at least one of vector instructions, no vector instructions, or any possible type of compiler optimization techniques. In some embodiments, modifying the binary structure of each of the first plurality of binary files to produce the second plurality of binary files at 204 may include extracting binary assembly code from each file in the first plurality of binary files, and modifying the binary assembly code extracted to produce a second file with a second binary structure that is different from the first binary structure of the binary file from which it was created. In some embodiments, modifying the binary structure of each of the first plurality of binary files to produce the second plurality of binary files at 204 may include extracting an execution graph from each file in the first plurality of binary files, and moving decision branches within the execution graph to produce a second file with a second binary structure that is different from the first binary structure of the binary file from which it was created. In some embodiments, modifying the binary structure of each of the first plurality of binary files to produce the second plurality of binary files at 204 may include decompiling each of the first plurality of binary files to produce decompiled code for each binary file, running the decompiled code of each binary file through a second machine learning algorithm that alters the decompiled code, and recompiling the altered decompiled code of each binary file of each of the first plurality of binary files to produce the second plurality of binary files each having the second binary structure that is different from the first binary structure.

At 206, the method 200 then uses the first and second plurality of binary files to train an AM machine learning model as to which files are malicious and which files are benign. At 208, the method 200 then uses the trained AM machine learning model to identify new malicious files analyzed.

The method may additionally include using the larger data set to train a machine learning algorithm on what files are malicious and what files are benign as the larger data set improves the accuracy of the machine learning algorithm compared to training the machine learning algorithm using just the files as originally received at 202. The method also includes providing a report via the input/output device based upon the machine learning algorithm's determination at 208.

FIG. 2 illustrates an example flow diagram representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

Figure 3:
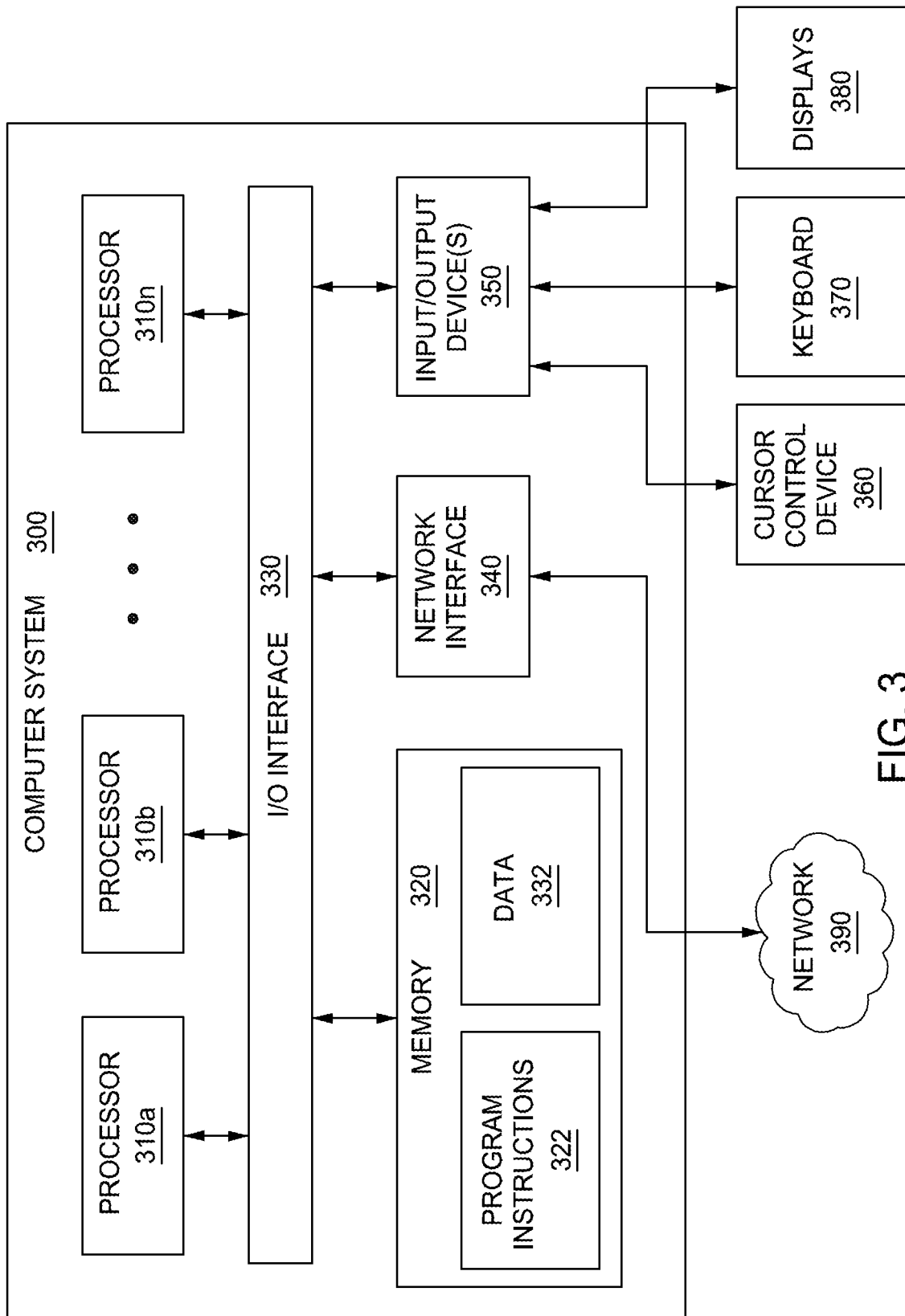
FIG. 3 depicts a high-level block diagram of a computing device suitable for use with embodiments for data augmentation used in training an anti-malware (AM) machine learning model in accordance with the present principles.

FIG. 3 depicts a computer system 300 that can be utilized in various embodiments of the invention to implement the computer and/or the display, according to one or more embodiments.

Various embodiments of method and system for training a computer security algorithm, as described herein, may be executed on one or more computer systems, which may interact with various other devices. One such computer system is computer system 300 illustrated by FIG. 3, which may in various embodiments implement any of the elements or functionality illustrated in FIGS. 1-2. In various embodiments, computer system 300 may be configured to implement methods described above. The computer system 300 may be used to implement any other system, device, element, functionality or method of the above-described embodiments. In the illustrated embodiments, computer system 300 may be configured to implement the method 200 as processor-executable executable program instructions 322 (e.g., program instructions executable by processor(s) 310) in various embodiments.

In the illustrated embodiment, computer system 300 includes one or more processors 310*a*-310*n* coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of the components may be utilized by the system to receive user input described above. In various embodiments, a user interface may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs). In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 330 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the operations and methods described above, such as the methods illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

What is claimed is:

1. A system for data augmentation used in training an anti-malware (AM) machine learning model comprising:
    an input/output device;
    a processor programmed to:
        receive a first plurality of binary files each having a first binary structure, wherein the first plurality of binary files include one or more known malicious files and one or more known benign files;
        modify the binary structure of each of the first plurality of binary files to produce a second plurality of binary files each having a second binary structure that is different from the first binary structure, and wherein each modified binary file is functionality similar to the corresponding file in the first plurality of binary files from which it was created;
        use the first and second plurality of binary files to train an AM machine learning model as to which files are malicious and which files are benign; and
        use the trained AM machine learning model to identify new malicious files.

2. The system of claim 1, wherein modifying the binary structure of each of the first plurality of binary files to produce the second plurality of binary files includes:
    decompiling each of the first plurality of binary files; and
    recompiling each of the first plurality of binary files to produce the second plurality of binary files each having the second binary structure that is different from the first binary structure.

3. The system of claim 2, wherein recompiling is performed using at least one of different compiler flags, different compiler options, a different compiler, or a different optimization level, than was used in producing the first plurality of binary files.

4. The system of claim 3, wherein the different optimization level includes at least one of vector instructions, no vector instructions, optimization based upon a specific central processing unit, optimization not based upon a specific central processing unit, no optimization, light optimization, medium optimization, or heavy optimization.

5. The system of claim 1, wherein modifying the binary structure of each of the first plurality of binary files to produce the second plurality of binary files includes:
    extracting binary assembly code from each file in the first plurality of binary files; and
    modifying the binary assembly code extracted to produce a second file with a second binary structure that is different from the first binary structure of the binary file from which it was created.

6. The system of claim 1, wherein modifying the binary structure of each of the first plurality of binary files to produce the second plurality of binary files includes:
    extracting an execution graph from each file in the first plurality of binary files; and
    moving decision branches within the execution graph to produce a second file with a second binary structure that is different from the first binary structure of the binary file from which it was created.

7. The system of claim 1, wherein each of the second plurality of files has at least one of a different hash code or a different number of bytes than the corresponding binary file from the first plurality of binary files from which it was created.

8. The system of claim 1, wherein the first and second plurality of files are executable files.

9. The system of claim 1, wherein modifying the binary structure of each of the first plurality of binary files to produce the second plurality of binary files includes:
    decompiling each of the first plurality of binary files to produce decompiled code for each binary file;
    running the decompiled code of each binary file through a second machine learning algorithm that alters the decompiled code; and
    recompiling the altered decompiled code of each binary file of each of the first plurality of binary files to produce the second plurality of binary files each having the second binary structure that is different from the first binary structure.

10. A method for data augmentation used in training an anti-malware (AM) machine learning model, the method comprising:
receiving a first plurality of binary files each having a first binary structure, wherein the first plurality of binary files include one or more known malicious files and one or more known benign files;
modifying the binary structure of each of the first plurality of binary files to produce a second plurality of binary files each having a second binary structure that is different from the first binary structure, and wherein each modified binary file is functionality similar to the corresponding file in the first plurality of binary files from which it was created;
using the first and second plurality of binary files to train an AM machine learning model as to which files are malicious and which files are benign; and
using the trained AM machine learning model to identify new malicious files.

11. The method of claim 10, wherein modifying the binary structure of each of the first plurality of binary files to produce the second plurality of binary files includes:
decompiling each of the first plurality of binary files; and
recompiling each of the first plurality of binary files to produce the second plurality of binary files each having the second binary structure that is different from the first binary structure.

12. The method of claim 11, wherein recompiling is performed using at least one of different compiler flags, different compiler options, a different compiler, or a different optimization level, than was used in producing the first plurality of binary files.

13. The method of claim 12, wherein the different optimization level includes at least one of vector instructions, no vector instructions, optimization based upon a specific central processing unit, optimization not based upon a specific central processing unit, no optimization, light optimization, medium optimization, or heavy optimization.

14. The method of claim 10, wherein modifying the binary structure of each of the first plurality of binary files to produce the second plurality of binary files includes:
extracting binary assembly code from each file in the first plurality of binary files; and
modifying the binary assembly code extracted to produce a second file with a second binary structure that is different from the first binary structure of the binary file from which it was created.

15. The method of claim 10, wherein modifying the binary structure of each of the first plurality of binary files to produce the second plurality of binary files includes:
extracting an execution graph from each file in the first plurality of binary files; and
moving decision branches within the execution graph to produce a second file with a second binary structure that is different from the first binary structure of the binary file from which it was created.

16. The method of claim 10, wherein each of the second plurality of files has at least one of a different hash code or a different number of bytes than the corresponding binary file from the first plurality of binary files from which it was created.

17. The method of claim 10, wherein the first and second plurality of files are executable files.

18. The method of claim 10, wherein modifying the binary structure of each of the first plurality of binary files to produce the second plurality of binary files includes:
decompiling each of the first plurality of binary files to produce decompiled code for each binary file;
running the decompiled code of each binary file through a second machine learning algorithm that alters the decompiled code; and
recompiling the altered decompiled code of each binary file of each of the first plurality of binary files to produce the second plurality of binary files each having the second binary structure that is different from the first binary structure.

19. A non-transitory computer readable storage medium having stored thereon a plurality of instructions that when executed by a processor of a computer security system that performs a method for data augmentation used in training an anti-malware (AM) machine learning model comprising:
receiving a first plurality of binary files each having a first binary structure, wherein the first plurality of binary files include one or more known malicious files and one or more known benign files;
modifying the binary structure of each of the first plurality of binary files to produce a second plurality of binary files each having a second binary structure that is different from the first binary structure, and wherein each modified binary file is functionality similar to the corresponding file in the first plurality of binary files from which it was created;
using the first and second plurality of binary files to train an AM machine learning model as to which files are malicious and which files are benign; and
using the trained AM machine learning model to identify new malicious files.

20. The non-transitory computer readable storage medium of claim 19, wherein modifying the binary structure of each of the first plurality of binary files to produce the second plurality of binary files includes:
decompiling each of the first plurality of binary files; and
recompiling each of the first plurality of binary files to produce the second plurality of binary files each having the second binary structure that is different from the first binary structure.

* * * * *